United States Patent [19]
Ryu

[11] Patent Number: 5,984,818
[45] Date of Patent: Nov. 16, 1999

[54] HYDRAULIC CONTROL SYSTEM FOR AUTOMATIC TRANSMISSIONS

[75] Inventor: Pyung-Hwan Ryu, Suwon-si, Rep. of Korea

[73] Assignee: Hyundai Motor Company, Seoul, Rep. of Korea

[21] Appl. No.: 09/195,197

[22] Filed: Nov. 18, 1998

[51] Int. Cl.[6] .................................................. F16H 61/04
[52] U.S. Cl. ........................................... 475/132; 475/133
[58] Field of Search .................... 475/132, 133; 477/117, 906

[56] References Cited

U.S. PATENT DOCUMENTS

| | | | |
|---|---|---|---|
| 5,655,994 | 8/1997 | Jang et al. | 477/117 |
| 5,658,220 | 8/1997 | Jang | 477/130 |
| 5,797,821 | 8/1998 | Fujimoto et al. | 475/120 |
| 5,813,941 | 9/1998 | Jang | 477/116 |
| 5,860,886 | 1/1999 | Kim | 475/128 |
| 5,876,303 | 3/1999 | Yu | 477/116 |
| 5,888,169 | 3/1999 | Jang | 477/130 |
| 5,895,334 | 4/1999 | Yu | 475/128 |

*Primary Examiner*—Dirk Wright

[57] ABSTRACT

Disclosed is a hydraulic control system for automatic transmissions. The hydraulic control system includes line pressure control means for controlling hydraulic pressure generated by an oil pump into line pressure suitable for each shift range; converter clutch control means for engaging and disengaging a converter clutch and supplying lubrication oil to a transaxle by controlling hydraulic pressure supplied from the line pressure control means; a manual valve for supplying hydraulic pressure supplied from the line pressure control means to correspond to each shift range; actuators for duty or ON/OFF-controlling hydraulic pressure supplied from the manual valve and the line pressure control means according to control signals of a transmission control unit; switching means for selectively supplying hydraulic pressure to first through ninth friction elements, and for supplying hydraulic pressure controlled in the actuators to selected friction elements when shifting from different shift ranges; and fail-safe means for either supplying or cutting off hydraulic pressure supplied from the switching means.

15 Claims, 5 Drawing Sheets

FIG. 5

| Shift Mode | | SOLENOID VALVES | | | | | FRICTION MEMBERS | | | | | | | | |
|---|---|---|---|---|---|---|---|---|---|---|---|---|---|---|---|
| | | S1 | S2 | S3 | S4 | S5 | 45 | 39 | 47 | 53 | 41 | 43 | 49 | 51 | 55 |
| R | | | | | ○ | ○ | | | | ○ | ○ | ○ | | | |
| N,P | | | | | | ○ | | | | | ○ | ○ | | | |
| D | D1 | ○ | | | | | | ○ | | | ○ | | | | |
| | D2 | ○ | ○ | | | | | ○ | | | ○ | | ○ | | |
| | D3 | ○ | ○ | ○ | | | | ○ | ○ | | ○ | | ○ | | |
| | D4 | ○ | ○ | ○ | ○ | | | ○ | ○ | | ○ | | | ○ | ○ |
| | D5 | ○ | ○ | ○ | ○ | ○ | | ○ | ○ | | | | ○ | ○ | ○ |
| 3 | D1 | ○ | | | | | | ○ | | | ○ | | | | |
| | D2 | ○ | ○ | | | | | ○ | | | ○ | | ○ | | |
| | D3 | ○ | ○ | ○ | | | ○ | ○ | ○ | | ○ | | ○ | | |
| 2 | D1 | ○ | | | | | | ○ | | | ○ | | | | |
| | D2 | ○ | ○ | | ○ | | ○ | ○ | | | ○ | | ○ | ○ | |
| L | D1 | ○ | | | | ○ | ○ | ○ | | | ○ | ○ | | | |

○ Indicates Engagement of Friction Members and a State Where Elietrical Current is Not Applied to the Normally on Solenoid Valves

HYDRAULIC CONTROL SYSTEM FOR AUTOMATIC TRANSMISSIONS

BACKGROUND OF THE INVENTION

1. Field of the Invention

The present invention relates to a hydraulic control system for automatic transmissions, and more particularly, to a hydraulic control system for automatic transmissions which realizes direct shifting by operating each friction element of a 5-speed automatic transmission, in which one-way clutches are applied to each of the friction elements, using hydraulic pressure duty controlled in actuators.

2. Description of the Related Art

Conventional automatic transmissions used in vehicles include a torque converter, a multi-stage gear shift mechanism connected to the torque converter, and a plurality of friction members actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated in an oil pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the oil pump to each valve and actuator.

In such a hydraulic control system, at least one of the friction elements is selectively engaged by the operation of the manual valve, actuators and valves to realize a plurality of shift modes. However, when shifting from a drive D range to a neutral N range by the operation of each friction element using independent duty control pressures of the actuators, since the friction elements are independently operated from a disengaged state to an engaged state by hydraulic pressure supplied from line pressure lines, shift shock is generated.

SUMMARY OF THE INVENTION

The present invention has been made in an effort to solve the above problems.

It is an object of the present invention to provide a hydraulic control system for automatic transmissions which reduces shift shock by directly operating friction members using duty control pressure of actuators when shifting from a drive D range to a neutral N range, and which, when the automatic transmission malfunctions, prevents the occurrence of shift failure by a transmission control unit (TCU) holding a third speed through the control of the actuators.

To achieve the above object, the present invention provides a hydraulic control system for automatic transmissions. The hydraulic control system includes line pressure control means for controlling hydraulic pressure generated by an oil pump into line pressure suitable for each shift range; converter clutch control means for engaging and disengaging a converter clutch and supplying lubrication oil to a transaxle by controlling hydraulic pressure supplied from the line pressure control means; a manual valve for supplying hydraulic pressure supplied from the line pressure control means to correspond to each shift range; actuators for duty or ON/OFF-controlling hydraulic pressure supplied from the manual valve and the line pressure control means according to control signals of a transmission control unit; switching means for selectively supplying hydraulic pressure to first through ninth friction elements, and for supplying hydraulic pressure controlled in the actuators to selected friction elements when shifting from different shift ranges; and fail-safe means for either supplying or cutting off hydraulic pressure supplied from the switching means.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 5 is a chart illustrating operating states of solenoid valves and friction members in different driving modes according to a preferred embodiment of the present invention.

DETAILED DESCRIPTION OF THE PREFERRED EMBODIMENTS

Preferred embodiments of the present invention will now be described in detail with reference to the accompanying drawings.

Figure 1:
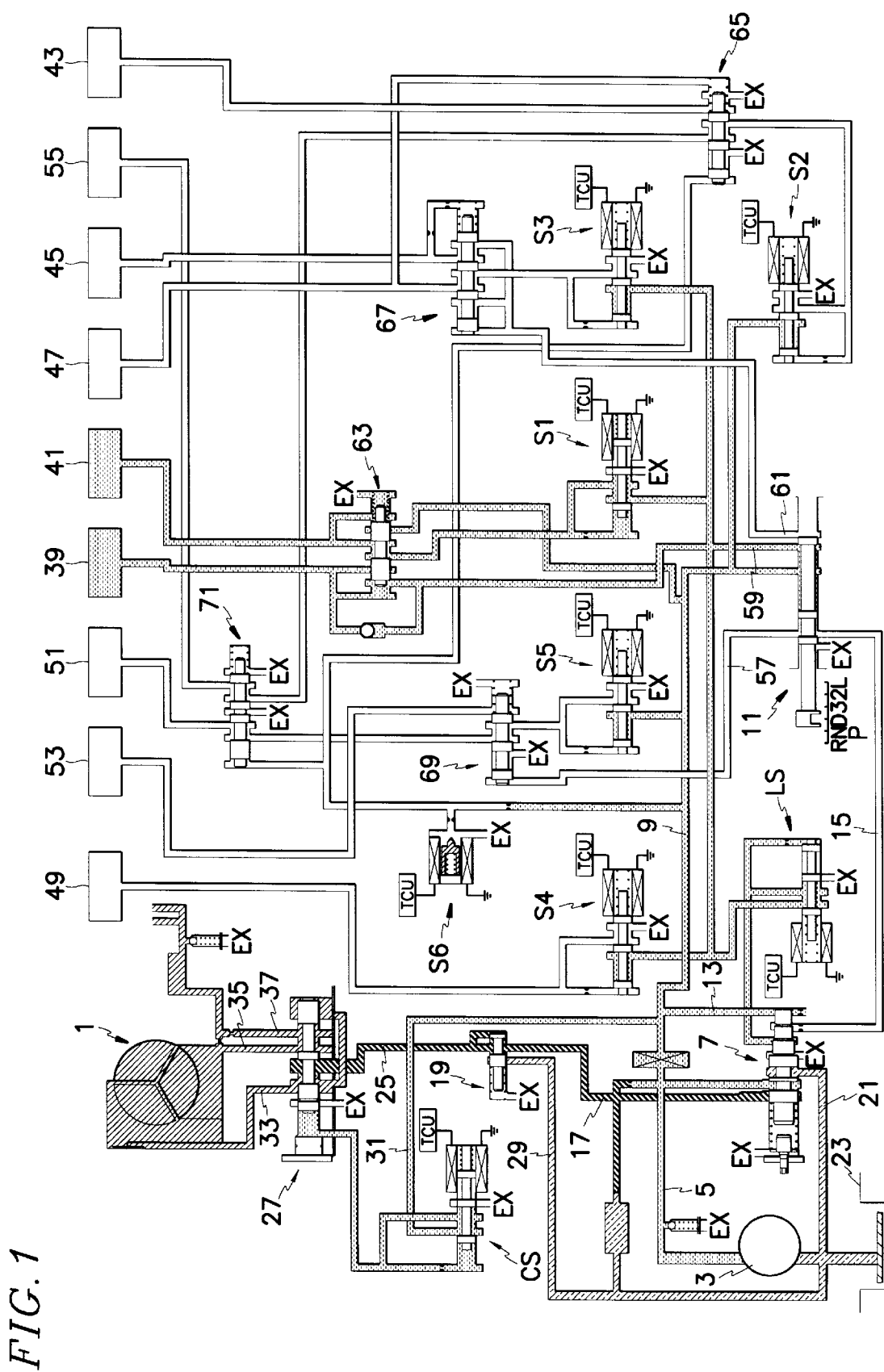
FIG. 1 is a hydraulic circuit diagram of a hydraulic control system for automatic transmissions in a first speed of a drive D range according to a preferred embodiment of the present invention.

FIG. 1 shows a hydraulic circuit diagram of a hydraulic control system for automatic transmissions in a first speed of a drive D range according to a preferred embodiment of the present invention. The hydraulic control system of the present invention performs automatic shifting of a transmission through the utilization of a TCU which duty-controls solenoid valves, or controls the same to ON and OFF states, according to various conditions such as throttle valve opening, vehicle load, vehicle speed, etc.

In more detail, with the operation of a torque converter 1, directly connected to a crankshaft of an engine to be driven by the same, an input shaft of the transmission is driven. At the same time, an oil pump 3, which includes a drive gear mounted to a pump drive hub of the torque converter 1 and a driven gear meshed with the drive gear, is driven to generate hydraulic flow, resulting in the formation of hydraulic pressure in the hydraulic control system.

The oil pump 3 is connected to a regulator valve 7 via a line 5, and the regulator valve 7 is connected to a line pressure line 9. Accordingly, hydraulic pressure generated by the oil pump 3 is received via the line 5 by the regulator valve 7, controlled therein to line pressure suitable to the driving conditions, then supplied to the line pressure line 9.

The regulator valve 7 is connected to a line pressure control solenoid valve LS which operates the line pressure supplied to the line pressure line 9 to act as control pressure on one side of the regulator valve 7. Further, the regulator valve 7 is connected to the line pressure line 9 and a manual valve 11, indexed with a select lever, via lines 13 and 15, respectively. Accordingly, the hydraulic pressure supplied from the line pressure line 9 and the manual valve 11 directly operate as control pressure of the regulator valve 7.

In addition, the regulator valve 7 is connected to a converter feed valve 19 via a line 17 for the supply of control pressure to a converter clutch and oil to a transaxle for the lubrication of the same. The regulator valve 7 is also connected to an oil pan 23 via a line 21 such that residual hydraulic pressure supplied to the line pressure line 9 and the converter feed valve 19 is fed back into the oil pan 23.

The converter feed valve 19 is connected to a converter clutch regulator valve 27 via a line 25 to supply hydraulic pressure to the same, and residual hydraulic pressure, remaining after the hydraulic pressure is supplied to the clutch regulator valve 27, is returned to the oil pan 23 via a line 29. Also, the converter clutch regulator valve 27 receives duty control pressure of a converter clutch control solenoid valve CS, connected to the line pressure line 9 via a line 3, to be controlled by the same to supply hydraulic pressure supplied from the converter feed valve 19 to the torque converter 1 and the transaxle. The converter clutch regulator valve 27 is further connected to the torque converter 1 through lines 33, 35 and 37.

The converter clutch control solenoid valve CS is duty controlled from ON to OFF and from OFF to ON, according to TCU control signals, to control the converter clutch regulator valve 27. Accordingly, the converter clutch regulator valve 27 supplies and exhausts hydraulic pressure to and from the torque converter 1 via the lines 33, 35 and 37 connecting these two elements, thereby engaging and disengaging a converter clutch.

The manual valve 11 is connected to the line pressure line 9 to receive a constant supply of line pressure in all shift modes and supplies hydraulic pressure to one or more of first to ninth friction elements 39, 41, 43, 45, 47, 49, 51, 53 and 55 according to the shift mode selected by user operation of the shift lever. That is, the manual valve 11 is indexed with the shift lever to supply hydraulic pressure fed to the line pressure line 9 to an R-range line 57, which supplies hydraulic pressure when a reverse R range is selected; a D-range line 59, which supplies hydraulic pressure when the drive D range is selected; and to a 3,2,L-range line 61, which supplies hydraulic pressure when 3, 2, or L ranges are selected.

The hydraulic pressure controlled in the regulator valve 7 and supplied to the line pressure line 9, and the hydraulic pressure supplied from the range lines 57, 59 and 61 of the manual valve 11 are duty controlled by actuators, which, in turn, are controlled by the TCU. As a result, these hydraulic pressures are directly supplied to each friction element as independent duty control pressure to operate the selected friction elements.

The above actuators, which duty control the hydraulic pressure supplied to the friction elements as in the above, are comprised of normal close-type first, second, third, fourth and fifth solenoid valves S1, S2, S3, S4 and S5. Further, there are provided first, second, third and fourth switch valves 63, 65, 67 and 69 for supplying the hydraulic pressure duty controlled in the first, second, third, fourth and fifth solenoid valves S1, S2, S3, S4 and S5 to the friction elements corresponding to each shift mode. These switch valves 63, 65, 67 and 69 are controlled by hydraulic pressure selectively supplied from the line pressure line 9 and the manual valve 11 through various lines connecting these elements.

The first solenoid valve S1 is provided on a line connecting the D-range line 59 with the first switch valve 63 to duty control the hydraulic pressure supplied through the D-range line 59 before supply to the first switch valve 63, or to exhaust the hydraulic pressure being exhausted from the same. The second, third, fourth and fifth solenoid valves S2, S3, S4, and S5 perform the same operation as the first solenoid valve S1, but between different elements of the hydraulic control system. That is, the second solenoid valve S2 performs the identical operation as the first solenoid valve S1 between the line pressure line 9 and the second switch valve 65; the third solenoid valve S3 between the D-range line 59 and the third switch valve 67; the fourth solenoid valve S4 between the D-range line 59 and the sixth friction element 49; and the fifth solenoid valve S5 between the line pressure line 9 and the fourth switch valve 69.

The first switch valve 63, which either receives the hydraulic pressure at duty controlled by the first, second, third, fourth and fifth solenoid valves S1, S2, S3, S4 and S5, or exhausts the hydraulic pressure to the same, has a valve spool structure and is mounted between the line pressure line 9, the D-range line 59, connected to the manual valve 11, and the first solenoid valve S1 on one side, and the first and second friction elements 39 and 41 on the other side.

Accordingly, after supplying the hydraulic pressure received from the first solenoid valve S1 to the first friction element 39, the first switch valve 63 supplies the hydraulic pressure to the second friction element 41, and, simultaneously, either supplies the hydraulic pressure received from the D-range line 59 to the first friction element 39, or exhausts the hydraulic pressure supplied to the same. In addition, the first switch 63 supplies the hydraulic pressure fed to the line pressure line 9 to the second friction element 41 in neutral N or park P ranges.

The second switch valve 65 has a spool valve structure and is mounted between the third friction element 43, the second solenoid valve S2 and a fail-safe valve 71, the fail-safe valve 71 being provided between the second and fourth switch valves 65 and 69 on one side and the seventh and ninth friction elements 51 and 55 on the other side, and functions to prevent shift failure when the transmission malfunctions. With this positioning, the second switch valve 65 either supplies the hydraulic pressure received from the second solenoid valve S2 to the fail-safe valve 71 for the select supply of the hydraulic pressure to the third friction element 43 and the ninth friction element 55, or exhausts the hydraulic pressure fed to the fail-safe valve 71. In addition, the second switch valve 65 prevents the third friction element 43 from operating when the fifth friction element 47 is engaged.

The third switch valve 67 has a spool valve structure and is provided between the third solenoid valve S3 and the 3,2,L-range line 61 on one side, and the fourth and fifth friction elements 45 and 47 on the other side. Accordingly, the third switch valve 67 selectively supplies the hydraulic pressure selectively received from the 3,2,L-range line 61 and the third solenoid valve to the fourth and fifth friction elements 45 and 47, or exhausts the hydraulic pressure supplied to the same.

The fourth switch valve 69 is provided between the R-range line 57 and the fifth solenoid valve S5 on one side and the eighth friction element 53 and the fail-safe valve 71 on the other side. Accordingly, the fourth switch valve 69 either supplies the hydraulic pressure received from the fifth solenoid valve S5 to the eighth friction element 53 and the fail-safe valve 71, or exhausts the hydraulic pressure supplied to the same.

The above fail-safe valve 71 is a spool valve that operates to control the sixth solenoid valve S6 to ON/OFF states, the sixth solenoid valve S6 controlling the hydraulic pressure supplied from the line pressure line 9. As a result, the fail-safe valve 71 either supplies hydraulic pressure from the second and fourth switch valves 65 and 69 to the seventh and ninth friction elements 51 and 55, respectively, or exhausts the hydraulic pressure supplied to the same.

That is, the fail-safe valve 71 controls the sixth solenoid valve S6 to ON when the transmission is operating normally to control the seventh and ninth friction elements 51 and 55 as in the above. However, if the transmission is malfunctioning, as the eighth solenoid valve S8 is controlled to OFF, the fail-safe valve 71 cuts off the hydraulic pressure supplied to the seventh and ninth friction elements 51 and 55 such that the hydraulic control system holds the third speed.

With reference to FIG. 1, in the hydraulic control system of the present invention structured as in the above, when the driver positions the select lever to the drive D range, the manual valve 11 communicates the line pressure line 59 and the D-range line 61. Further, the line pressure control solenoid valve LS is duty controlled by the TCU to control line pressure to a level suitable for the first speed, and the converter clutch control solenoid valve CS is controlled to OFF to release the converter clutch.

In addition, the TCU controls the first solenoid valve S1 from ON to OFF, and the second, third, fourth and fifth solenoid valves S2, S3, S4 and S5 to ON. Therefore, the hydraulic pressure fed to the line pressure line 9 is supplied to the D-range line 59 of the manual valve 1, passes through the first solenoid valve S1 and the first switch valve 63, and is then supplied to the first friction element 39 to engage the same.

Further, part of the hydraulic pressure supplied to the first friction element 39 is supplied to the first switch valve 63 to control the same. Accordingly, the hydraulic pressure supplied to the D-range line 59 is supplied to the first friction element 39 via the first switch valve 63 to continue the engagement of the first friction element 39. Simultaneously, the hydraulic pressure supplied from the first solenoid valve S1 passes through the first switch valve 63, which has undergone port conversion, to be fed to the second friction element 41 for engagement of the same. As a result, in the first speed of the drive D range, the first solenoid valve S1 is duty controlled from ON to OFF, and, as shown in FIG. 5, the first and second friction elements 39 and 41 are engaged.

Figure 2:
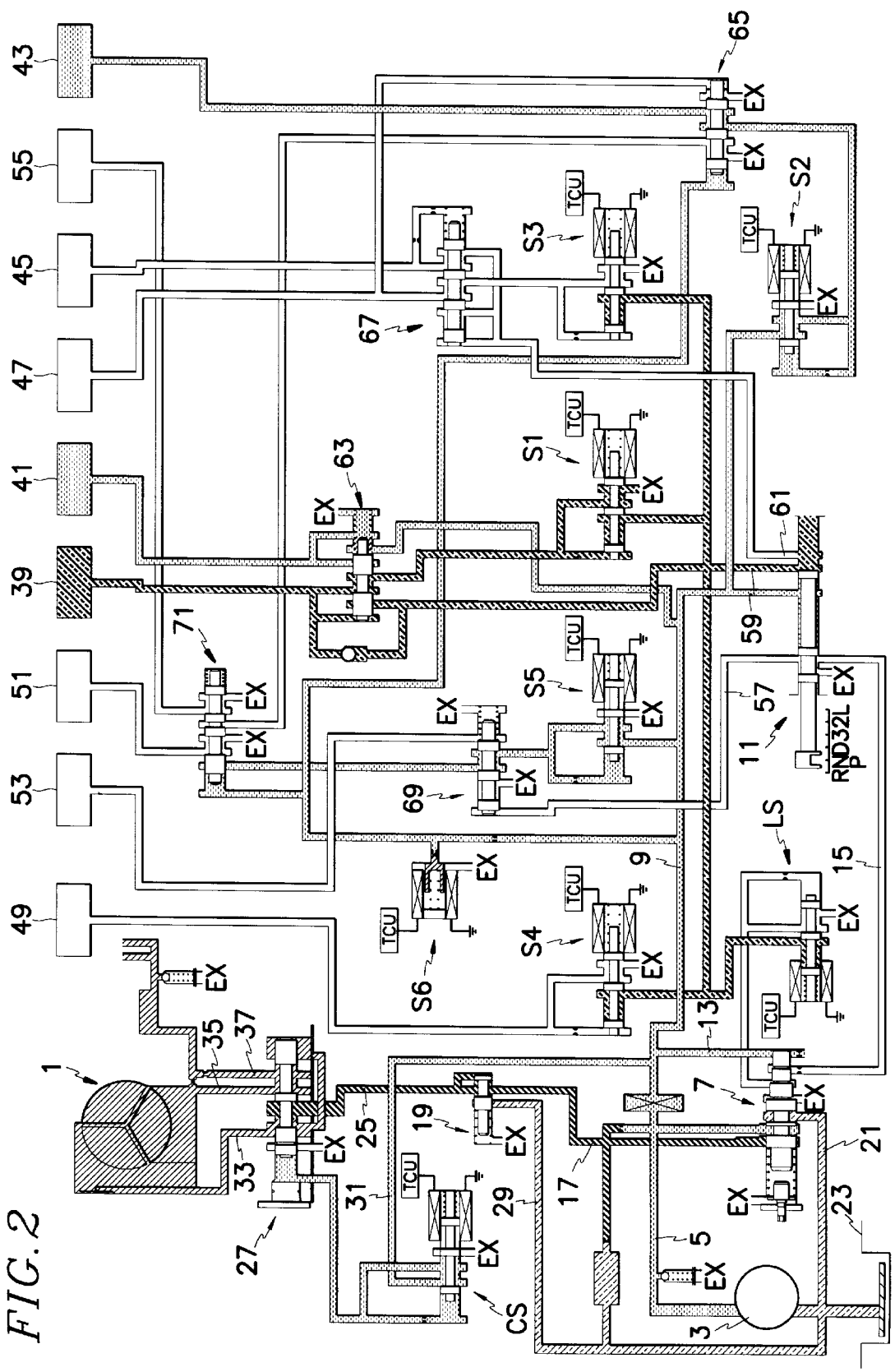
FIG. 2 is a hydraulic circuit diagram of the hydraulic control system shown in FIG. 1 in a state when shifting from the first speed of the drive D range to a neutral N range.

Referring now to FIG. 2, if the driver positions the select lever to the neutral N range from the above first speed of the drive D range, the manual valve 11 cuts off the supply of hydraulic pressure to the line pressure line 9 and the D-range line 59. Further, the TCU controls the first solenoid valve S1 from OFF to ON, duty controls the second solenoid valve S2 from ON to OFF, and controls the sixth solenoid valve from ON to OFF.

As a result, the hydraulic pressure supplied to the D-range line 59 is exhausted via the manual valve 11. Also, the hydraulic pressure operating the first friction element 39 is exhausted through the manual valve 11, and the hydraulic pressure operating the second friction element 41 is exhausted through the first switch valve 63, thereby disengaging the first and second friction elements 39 and 41.

However, as the second solenoid valve S2 is controlled to OFF, the hydraulic pressure supplied to the line pressure line 9 is supplied to the second switch valve 65 through the second solenoid valve S2. At this time, the hydraulic pressure supplied to the line pressure line 9 according to the OFF control of the sixth solenoid valve S6 controls the second switch valve 65. Accordingly, the hydraulic pressure supplied via the second solenoid valve S2 to the second switch valve 65 passes through the same, and is supplied to the third friction element 43 for engagement of the same, thereby realizing a reduction in shift shock when shifting into the neutral N range from the drive D range. In the neutral N range, the third friction element 43 is engaged by the duty control of the second solenoid valve from ON to OFF as shown in FIG. 5.

Figure 3:
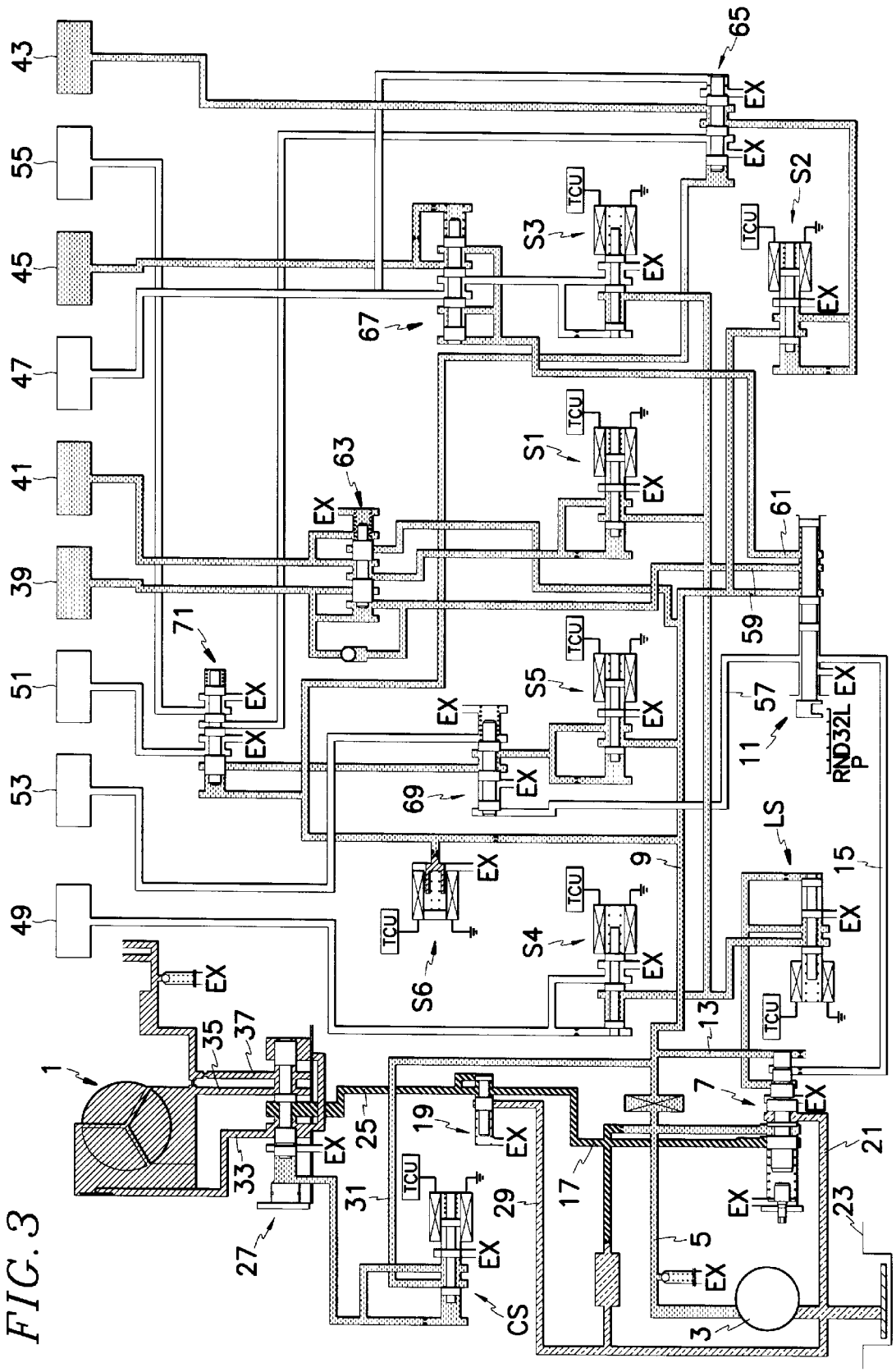
FIG. 3 is a hydraulic circuit diagram of the hydraulic control system shown in FIG. 1 in a low L range.
Figure 4:
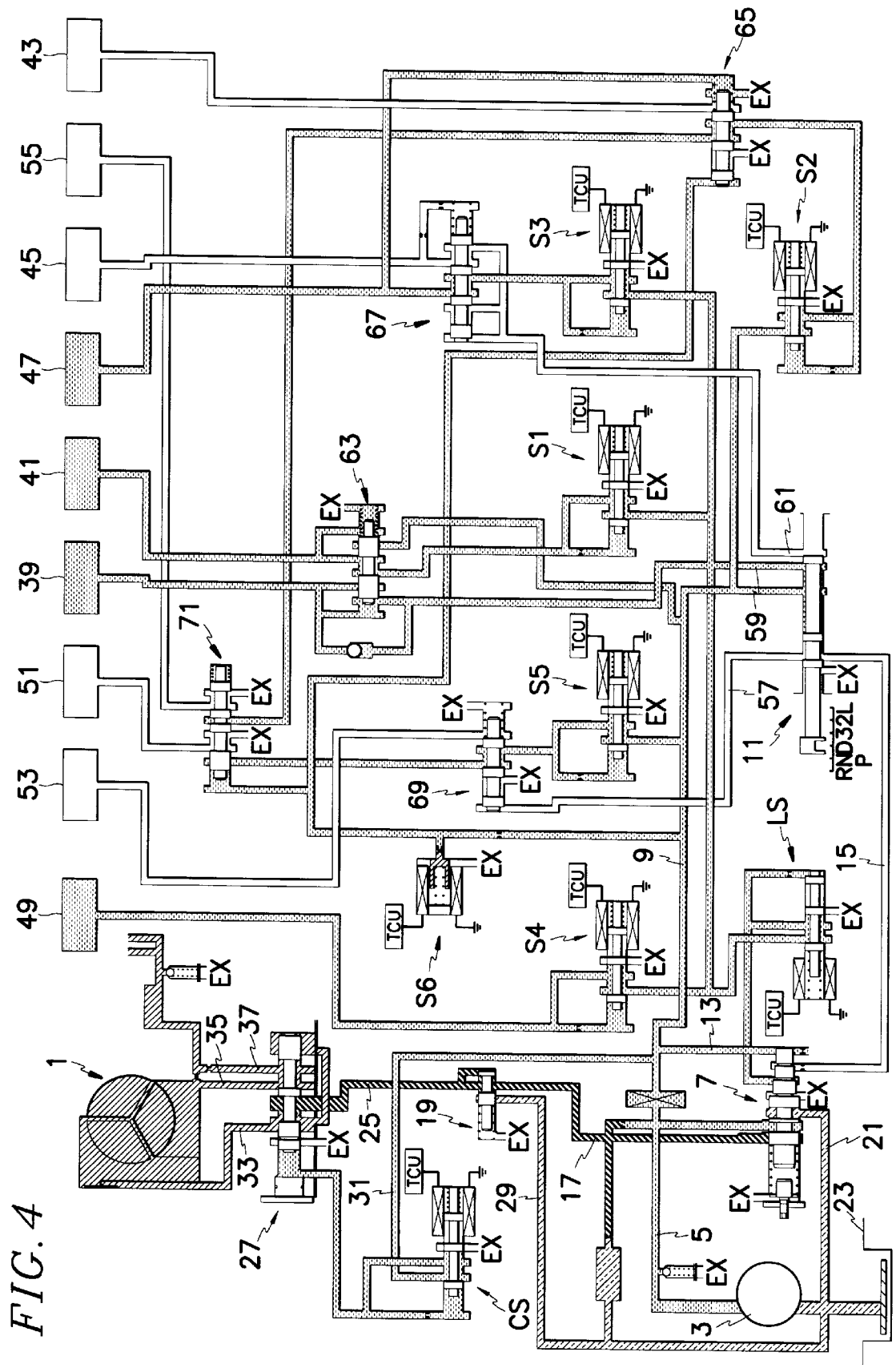
FIG. 4 is a hydraulic circuit diagram of the hydraulic control system shown in FIG. 1 in a state holding a third speed of the drive D range.

Referring now to FIG. 3, if the driver positions the select lever to a low L range from the first speed of the drive D range, the manual valve 11 communicates the line pressure line 9 with the D-range line 59 and the 3,2,L-range line 61. Further, the TCU duty controls the second and sixth solenoid valves S2 and S6 from ON to OFF.

As a result, the hydraulic pressure supplied to the line pressure line 9 is supplied to the second switch valve 65 via the second solenoid valve S2. At this time, resulting from the OFF control of the sixth solenoid valve S6, the hydraulic pressure supplied to the line pressure line 9 controls the second switch valve 65 such that the hydraulic pressure supplied thereto via the second solenoid valve S2 is fed to the third friction element 43 for engagement of the same. Therefore, when shifting into the low L range from the first speed of the drive D range, the third friction element 43 is operated as a result of the duty control of the second solenoid valve S2 from ON to OFF as shown in FIG. 5.

Further, when driving in the drive D range, if a malfunction occurs in the transmission, in a state where the manual valve 11 is connected to the line pressure line 9 and the D-range line 59, the TCU detects the malfunction and controls all the solenoid valves LS, CS, S1, S2, S3, S4, S5 and S6 to OFF. As a result, the hydraulic pressure supplied to the D-range line 59 passes through the first solenoid valve S1 and the first switch valve 63 to be fed to the first friction element 39 to operate the same, then operates the second friction element S2 by being supplied thereto. At this time, the first friction element 39 is maintained in an engaged state by the hydraulic pressure supplied from the line pressure line 9, which is connected to the first switch valve 63.

In addition, the hydraulic pressure supplied to the D-range line 59 is supplied via the fourth solenoid valve S4 to the sixth friction element 49 to operate the same, and passes through the third solenoid valve S3 and the third switch valve 67 to operate the fifth friction element 47 by being supplied thereto. The hydraulic pressure operating the fifth friction element 47 is also supplied to the second switch valve 65 to operate the same.

Accordingly, the hydraulic pressure supplied to the line pressure line 9 is supplied to the fail-safe valve 71 via the second solenoid valve S2 and the second switch valve 65, and via the fifth solenoid valve S5 and the fourth switch valve 69. However, at this point, by the OFF control of the sixth solenoid valve S6, the hydraulic pressure supplied to the line pressure line 9 controls the fail-safe valve 71, and the hydraulic pressure supplied to the fail-safe valve 71 is cut off such that additional hydraulic pressure is no longer fed thereto.

Therefore, when the transmission is malfunctioning, the first, second, fifth and sixth friction elements 39, 41, 47 and 49 are operated to hold the third speed, thereby preventing shift failure.

In the hydraulic control system according to the preferred embodiment of the present invention structured and operating as in the above, the second switch valve, controlling the hydraulic pressure supplied to the third friction element which is disengaged in the drive D range and engaged in the neutral N range, is connected to the second solenoid valve to receive the hydraulic pressure controlled in the same. As a result, the third friction element is directly operated by duty control pressure of the second solenoid valve when shifting from the drive D range to the neutral N range, thereby reducing shift shock.

Further, by providing the fail-safe valve between the combination of the second and fourth switch valves and the ninth and seventh friction elements, the fail-safe valve being controlled by the sixth solenoid valve, if the transmission malfunctions, the hydraulic pressure supplied to the ninth and seventh friction elements is cut off to hold the third speed. Hence, shift failure is prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for automatic transmissions comprising:

line pressure control means for controlling hydraulic pressure generated by an oil pump into line pressure suitable for each shift range;

converter clutch control means for engaging and disengaging a converter clutch and supplying lubrication oil to a transaxle by controlling hydraulic pressure supplied from the line pressure control means;

a manual valve indexed with a driver-operated shift lever to supply hydraulic pressure supplied from the line pressure control means to correspond to each shift range;

actuators for duty or ON/OFF-controlling hydraulic pressure supplied from the manual valve and the line pressure control means according to control signals of a transmission control unit;

switching means for selectively supplying hydraulic pressure to first, second, third, fourth, fifth, sixth, seventh, eighth and ninth friction elements by realizing port conversion through the select supply of hydraulic pressure from the actuators and the manual valve, and for supplying hydraulic pressure controlled in the actuators to selected friction elements when shifting from a drive D range to a neutral N range; and fail-safe means for either supplying or cutting off hydraulic pressure supplied from the switching means to prevent shift failure when the automatic transmission is malfunctioning.

2. The hydraulic control system of claim 1 wherein the manual valve is connected to a line pressure line to receive line pressure from the line pressure control means; to a D-range line supplying hydraulic pressure when the drive D range is selected; to a 3,2,L-range line supplying hydraulic pressure when drive 3, 2 or low L ranges are selected; and a R-range line supplying hydraulic pressure when a reverse R range is selected.

3. The hydraulic control system of claim 1 wherein the actuators comprise normal close-type first, second, third, fourth and fifth solenoid valves supplying hydraulic pressure to one of the first, second, third, fourth, fifth, sixth, seventh, eighth or ninth friction elements, and which control hydraulic pressure exhausted from the selected friction element.

4. The hydraulic control system of claim 3 wherein the first solenoid valve supplies hydraulic pressure to the first and second friction elements, and is provided between a D-range line, connected to the manual valve, and a first switch valve of the switching means to control hydraulic pressure exhausted from the first and second friction elements.

5. The hydraulic control system of claim 3 wherein the second solenoid valve supplies hydraulic pressure to the third and ninth friction elements, and is provided between a line pressure line, connected to the line pressure control means, and a second switch valve of the switching means to control hydraulic pressure exhausted from the third and ninth friction elements.

6. The hydraulic control system of claim 3 wherein the third solenoid valve supplies hydraulic pressure to the fourth and fifth friction elements, and is provided between a D-range line, connected to the manual valve, and a third switch valve of the switching means to control hydraulic pressure exhausted from the fourth and fifth friction elements.

7. The hydraulic control system of claim 3 wherein the fourth solenoid valve supplies hydraulic pressure to the sixth friction element, and is provided between a D-range line, connected to the manual valve, and the sixth friction element to control hydraulic pressure exhausted from the same.

8. The hydraulic control system of claim 3 wherein the fifth solenoid valve supplies hydraulic pressure to the seventh and eighth friction elements, and is provided between a D-range line, connected to the manual valve, and a fourth switch valve of the switching means to control hydraulic pressure exhausted from the seventh and eighth friction elements.

9. The hydraulic control system of claim 1 wherein the switching means comprises first, second, third and fourth switch valves which supply hydraulic pressure to each of the friction elements and exhaust the hydraulic pressure from the same, the hydraulic pressure being supplied from the actuators controlled by hydraulic pressure selectively fed from a line pressure line connected to the line pressure control means, a D-range line connected to the manual valve, and a 3,2,L-range line.

10. The hydraulic control system of claim 9 wherein the first switch valve is provided between the line pressure line connected to the line pressure control means, the D-range line connected to the manual valve, and a first solenoid valve of the actuators on one side, and the first and second friction elements on the other side.

11. The hydraulic control system of claim 9 wherein the second switch valve is provided between combinations of the third friction element and the fifth friction element, and a fail-safe valve of the fail-safe means and a second solenoid valve of the actuators.

12. The hydraulic control system of claim 9 wherein the third switch valve is provided between a third solenoid valve of the actuators and a 3,2,L-range line connected to the manual valve on one side, and the fourth and fifth friction elements on the other side.

13. The hydraulic control system of claim 9 wherein the fourth switch valve is provided between an R-range line connected to the manual valve and a fifth solenoid valve of the actuators on one side, and the eighth friction element and a fail-safe valve of the fail-safe means on the other side.

14. The hydraulic control system of claim 1 wherein the fail-safe means comprises:

a fail-safe valve which supplies hydraulic pressure received from second and fourth switch valves of the switching means to the ninth and seventh friction elements when the automatic transmission is operating normally, and, when the automatic transmission is malfunctioning, activates hydraulic pressure supplied to a line pressure line connected to the line pressure control means and cuts off hydraulic pressure supplied from the second and fourth switch valves such that hydraulic pressure is not supplied to the ninth and seventh friction elements; and a sixth solenoid valve ON/OFF operating to control the hydraulic pressure fed to the line pressure line, thereby enabling the fail-safe valve perform the above operation.

15. The hydraulic control system of claim 14 wherein the sixth solenoid valve is controlled to ON when the vehicle is started to exhaust hydraulic pressure supplied from the line pressure line so that hydraulic pressure does not operate on the fail-safe valve.

* * * * *